United States Patent
Das et al.

(10) Patent No.: US 9,903,947 B2
(45) Date of Patent: Feb. 27, 2018

(54) BOUNDARY SIGNAL DETECTION

(71) Applicants: Deere and Company, Moline, IL (US); The Board of Trustees of the University of Illinois, Urbana, IL (US)

(72) Inventors: Colin E. Das, Cedar Falls, IA (US); Brent R. Trenhaile, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/822,821

(22) Filed: Aug. 10, 2015

(65) Prior Publication Data
US 2017/0045612 A1 Feb. 16, 2017

(51) Int. Cl.
*G01S 13/88* (2006.01)
*A01D 34/00* (2006.01)
*G05D 1/00* (2006.01)

(52) U.S. Cl.
CPC .......... *G01S 13/881* (2013.01); *A01D 34/008* (2013.01); *G05D 1/0088* (2013.01)

(58) Field of Classification Search
CPC ..... G01S 13/881; G01S 13/931; G08G 1/167; A01D 34/008; G05D 1/0088; G06F 17/14; B25J 13/00; H04L 5/06; H04B 1/001
USPC ................. 700/250, 255, 258; 701/300–301; 702/77
See application file for complete search history.

(56) References Cited

U.S. PATENT DOCUMENTS

| | | | | |
|---|---|---|---|---|
| 6,300,737 | B1* | 10/2001 | Bergvall | A01D 34/008 180/167 |
| 6,556,916 | B2* | 4/2003 | Waite | G08G 1/042 340/933 |
| 8,725,316 | B2* | 5/2014 | Thompson | A01D 34/008 701/2 |
| 2005/0283309 | A1 | 12/2005 | Sonoura | |
| 2010/0161204 | A1 | 6/2010 | Jou et al. | |
| 2012/0029754 | A1 | 2/2012 | Thompson et al. | |
| 2013/0211625 | A1 | 8/2013 | Thompson et al. | |
| 2014/0088761 | A1 | 3/2014 | Shamlian et al. | |

FOREIGN PATENT DOCUMENTS

| | | |
|---|---|---|
| DE | 69829411 | 1/2006 |
| WO | WO2010046260 | 4/2010 |
| WO | WO2013185622 | 12/2013 |

OTHER PUBLICATIONS

European Search Report for GB1612759.9 dated Jan. 23, 2017.
German Search Report for App. Ser. No. 102016009087.1 dated May 12, 2017.

* cited by examiner

*Primary Examiner* — Bao Long T Nguyen
(74) *Attorney, Agent, or Firm* — Rathe Lindebaum LLP (57) ABSTRACT

A boundary signal detection system distinguishes a valid boundary signal for a target region from an extraneous boundary signal for a neighboring region. The system includes electronics that convert the candidate signal from a time domain to a frequency domain to identify at least one embedded frequency in the candidate, that compare the at least one embedded frequency in the candidate signal to at least one predetermined embedded frequency of the valid boundary signal, and that identify the candidate signal as the valid boundary signal based upon the comparison.

19 Claims, 7 Drawing Sheets

BOUNDARY SIGNAL DETECTION

BACKGROUND

Boundary signals are used to identify the boundary or perimeter of a structure or region. In some circumstances, the use of such boundary signals is difficult due to extraneous signals or other boundary signals corresponding to other nearby or neighboring regions.

DETAILED DESCRIPTION OF EXAMPLES

Figure 1:
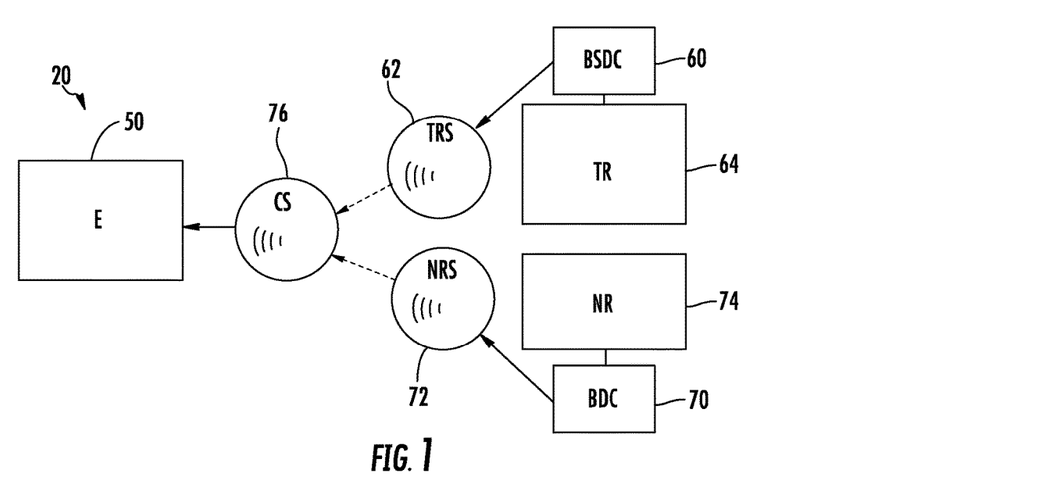
FIG. 1 is a schematic diagram of an example boundary signal detection system.

FIG. 1 schematically illustrates an example boundary signal detection system 20. As will be described hereafter, boundary signal detection system 20 distinguishes or discerns between a chosen or valid boundary signal for a particular intended or target region and those extraneous boundary signals that may correspond to regions that are not of interest and that may overlap the valid boundary signal in the time domain. As a result, system 20 is able to filter out or ignore such extraneous boundary signals while acting upon the identified valid boundary signal for the particular target region.

As schematically shown by FIG. 1, boundary signal detection system 20 comprises electronics 50. Electronics 50 comprises electronic circuitry configured to carry out the example method 100 outlined in FIG. 2. In one implementation, electronics 50 comprises at least one application-specific integrated circuit (ASIC). In one implementation, electronics 50 comprises at least one processing unit and associated memory.

In one implementation, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage device or non-transitory computer-readable medium. In other embodiments, hard wired circuitry may be used in place of or in combination with software instructions to implement the functions described. For example, electronics 50 may be embodied as part of one or more application-specific integrated circuits (ASICs). Unless otherwise specifically noted, the controller is not limited to any specific combination of hardware circuitry and software, nor to any particular source for the instructions executed by the processing unit.

As schematically shown by FIG. 1, electronics 50 is operable in an environment in which multiple boundary signal driving circuits output boundary signals corresponding to associated regions. In one implementation, a "region" when referring to a target region or a neighboring region, for example, refers to a perimeter or edge, wherein the perimeter or edge may be the perimeter or edge defining the inside of a closed area, surface or structure, the outside of a closed area, surface or structure and/or a portion of either the inside or outside perimeter edge of an area, surface or structure.

In the example illustrated, boundary driving circuit 60 (schematically shown) outputs a chosen, valid or target region signal (TRS) 62 that identifies the boundaries of a target region 64. In the example illustrated, boundary driving circuit 70 (schematically shown) outputs an extraneous or neighboring region signal (NRS) 72 for the boundary of a neighboring region 74, a region that is adjacent to target region 64 or that is spaced from, but sufficiently nearby target region 64 such that electronics 50 receives extraneous boundary signal 72. In the example illustrated, electronics 50 operate in an environment in which electronics 50 is capable of receiving a candidate boundary signal 76. As indicated by broken line arrows, in some circumstances, candidate signal 76 comprises a valid boundary signal 62 from circuit 60 for the target region 64. However, in other circumstances, candidate signal 76 comprises an extraneous boundary signal 72 from boundary signal driving circuit 70 for neighboring region 74. In some circumstances, valid boundary signal 62 and extraneous boundary signal 72 mix, overlap or are concurrently received by electronics 50. As a result, candidate signal 76 comprises the valid boundary signal 62, the extraneous boundary signal 72 or a combination of signals 62, 72.

Electronics 50 determines whether candidate signal 76 is either the target region signal 62 originating from boundary signal driving circuit 60 or whether candidate signal 76 is the neighboring region signal 72 originating from a different source other than boundary signal driving circuit 60. In circumstances where candidate signal 76 comprises an amalgamation of valid and extraneous boundary signals, electronics 50 discerns those portions of the candidate signal 76 that are valid boundary signals for the target region of interest from those portions that are not.

In one implementation, if the candidate signal 76 is identified as comprising or including a valid boundary signal, the valid boundary signal is analyzed and acted upon. For example, in one implementation, electronics 50 utilizes the valid boundary signal to determine the positioning of a structure, object, or vehicle relative to the boundaries of the target region 64. In one implementation, electronics 50 utilizes the determined positioning of the structure, object, or vehicle to notify an operator or other nearby persons or nearby animals of the positioning or distance separating the structure, object, or vehicle from the boundary. For example, a warning light, audible sound or other notification is provided. In another implementation, electronics 50 utilizes the determined positioning of a vehicle to assist in steering, driving or maneuvering of a vehicle, whether it be a robotic vehicle or robotic appliance or whether the vehicle be operated by a person, wherein electronics 50 temporarily assumes steering or maneuvering control. For example, based upon the determined positioning, electronics 50 adjusts the speed at which a vehicle is moving and/or a direction in which the vehicle is moving. In yet another implementation, electronics 50 additionally or alternatively utilizes the determined positioning of the vehicle relative to the boundary to make decisions and to control a tool or tools carried by the vehicle. For example, in the case of a mower, electronics 50 utilizes the determined positioning of the vehicle as a basis for adjusting a height of the cutting deck, the speed of the cutting blade and/or whether a blade is driven or its rotation is stopped or braked.

In some implementations, upon identifying that a candidate signal 76 or portions of a candidate signal 76 is not a valid signal, as not originating from boundary signal driving circuit 60, electronics 50 stores characteristics of the "invalid" extraneous boundary signal. In such a circumstance, electronics 50 utilizes stored characteristics of the extraneous boundary signal to more quickly identify subsequently received candidate signals as extraneous boundary signals. For example, in one implementation, once an invalid or extraneous boundary signal has been identified and its characteristics have been stored, electronics 50, upon receiving a subsequent different candidate signal 76 begins its analysis by immediately comparing the subsequently received candidate signal 76 to those characteristics of signals already previously determined as being extraneous.

Figure 2:
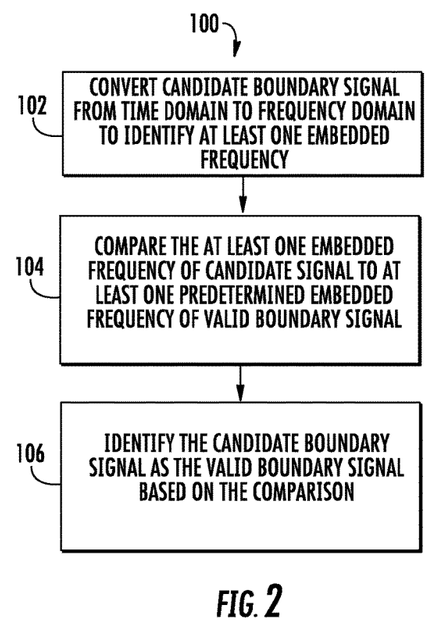
FIG. 2 is a flow diagram of an example method for distinguishing a valid target region boundary signal from an extraneous signal.

In one implementation, electronics 50 determines whether a candidate signal 76 is either a valid boundary signal or an extraneous boundary signal according to the method 100 depicted in FIG. 2. As indicated by block 102 in FIG. 2, electronics 50 converts candidate boundary signal 76 from a time domain to a frequency domain signal. According to one implementation of system 20, boundary signal driving circuit 60 embeds at least one predetermined frequency in the valid target boundary region signal 62. The embedded frequency or embedded combination of frequencies serve as a signature identifying the valid signal 62 as originating from boundary signal driving circuit 60 and corresponding to target region 64. By converting candidate boundary signal 76 from a time domain to a frequency domain, electronics 50 facilitates extraction and analysis of the embedded frequencies.

As indicated by block 104 of FIG. 2, electronics 50 compares the at least one embedded frequency of the candidate signal 76 to at least one predetermined embedded frequency of a valid boundary signal 62. As noted above, boundary signal driving circuit 60 generates valid target region boundary signal 62 having predetermined embedded frequencies. Such predetermined embedded frequencies and/or characteristics of such predetermined embedded frequencies are communicated to or otherwise obtained or acquired by electronics 50. For example, in one implementation, electronics 50 stores a lookup table or other list of embedded frequencies or characteristics of embedded frequencies that correspond to valid target region boundary signals, such as signal 62. In one implementation, boundary signal driving circuits 60 are provided by the same manufacturer, supplier, distributor or the like and are each configured to output boundary region target signals 62 having different embedded frequencies or different combinations of embedded frequencies to reduce a likelihood that neighboring boundary signal driving circuits from the same manufacturer, supplier, distributor or the like inadvertently output boundary signals having the same characteristic embedded frequencies.

As indicated by block 106 in FIG. 2, electronics 50 identifies the candidate boundary signal 76 as a valid target region boundary signal 62 based upon the comparison. Alternatively, electronics 50 identifies a candidate boundary signal 76 as an invalid or extraneous boundary signal 72. As described above, if the candidate signal 76 is identified as comprising or including a valid boundary signal, the valid boundary signal is analyzed and acted upon.

Figure 3:
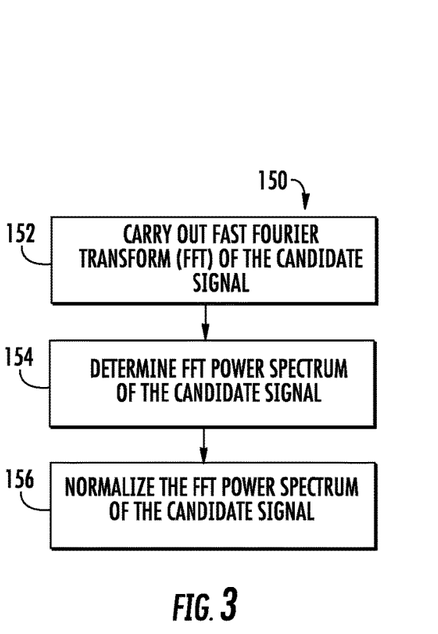
FIG. 3 is a flow diagram of an example method for converting a candidate boundary signal from a time domain to a frequency domain.

FIG. 3 is a flow diagram illustrating one example method 150 by which electronics 50 converts candidate boundary signal 76 from a time domain to a frequency domain for determining whether a candidate signal 76 is a valid target region boundary signal 62. As indicated by block 152, electronics 50 carries out a Fourier transform of the candidate signal. In the example illustrated, electronics 50 carry out a fast Fourier transform of the candidate signal.

As indicated by blocks 154 and 156, electronics 50 determine a fast Fourier transform power spectrum of the candidate signal 76 and then normalize the fast Fourier power transform of the candidate signal 76. By determining a normalized fast Fourier power spectrum, electronics 50 facilitates more reliable comparisons in block 104 of method 100 shown in FIG. 2. In other implementations, such comparisons of the embedded frequency in block 104 of method 100 are alternatively carried out using fast Fourier power spectrum that are not normalized per block 156 or using Fourier transforms of the candidate signal 76 or fast Fourier transforms of the candidate signal 76 directly, without determination of a power spectrum or normalization.

Figure 4:
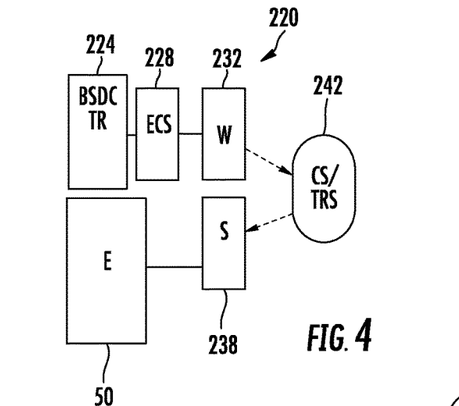
FIG. 4 is a schematic diagram of another example boundary signal detection system.

FIG. 4 schematically illustrates boundary signal detection system 220, an example boundary signal detection system 20. Boundary signal detection system 220 comprises boundary signal driving circuit 224, electrical current source 228, wire 232, boundary signal sensor 238 and electronics 50. Boundary signal driving circuit 224 comprises a circuit that outputs control signals that control electrical current source 228.

Electrical current source 228 is electrically connected to wire 232 and provides an electrical current along wire 232 based upon the control signals received from boundary signal driving circuit 224. The control signals from boundary signal driving circuit 224 cause electrical current source 228 to output an electrical current to wire 232 which fluctuates over time to define signal 62. The electrical current fluctuates over time with at least one predetermined embedded frequency.

Wire 232 comprises an electrically conductive line extending along or proximate to a boundary of a target region, such as target region 64. In one implementation, wire 232 is buried below the surface. The electrical current flowing through the wire creates a magnetic field 242 about wire 232. This magnetic field 242 fluctuates over time and serves as target region boundary signal 62. This magnetic field 242 that fluctuates over time with at least one frequency that is equal to or within a predefined range of at least one predefined frequency known to electronics 50 as a signature or signatures of a valid target region boundary signal. This magnetic field 242 constitutes the valid signal 62 for the target region and is the initial candidate signal 76 that is later determined to be valid signal 62 by electronics 50.

Sensor 238 comprises a device that picks up or acquires candidate signals. In the example illustrated, sensor 238 comprises an inductor which, when exposed to the magnetic field 242, produces an electrical current. Sensor 238 converts the candidate signal 76/target region boundary signal 62, in the form of magnetic field 242, to an electrical current. At least one characteristic of the electrical current is sensed, wherein signals from the sensed electrical current are used by electronics 50 to discern the candidate signal 76 as either a valid target region boundary signal 62 or an extraneous neighboring region signal 72. In circumstances where electronics 50 has determined that the candidate signal 76 is indeed a valid target region boundary signal 62, electronics 50 then uses the valid target region boundary signal 62 to determine relative positioning of wire 232 and the corresponding boundaries of target region 64.

In the example illustrated, electronics 50 determines a voltage that is associated with the electrical current. In the example illustrated, electronics 50 transforms the pattern of the sensed voltage 308 from a time domain to a frequency domain and compares it with at least one embedded frequency of the candidate signal 76 to at least one predetermined embedded frequency that is known to electronics 50 to correspond to a valid boundary signal. Based on the comparison, electronics 50 determines whether the candidate boundary signal 76 is a valid boundary signal 62 as described above with respect to method 100 in FIG. 2.

Figure 5A:
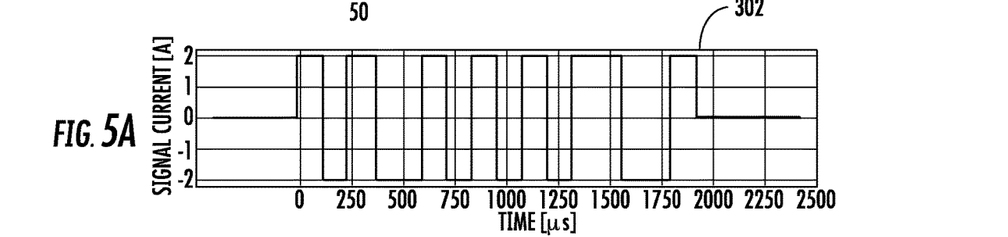
FIGS. 5A-5D are graphs illustrating the generation, transmission, and sensing of any target region boundary signal.
Figure 5B:
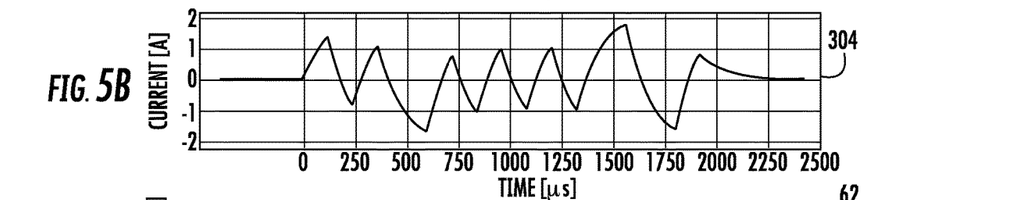
Figure 5C:
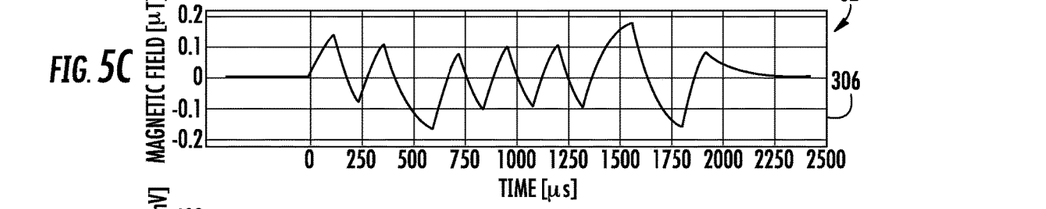
Figure 5D:
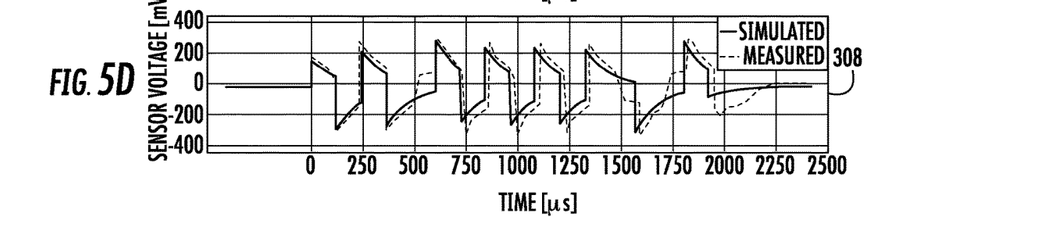

FIGS. 5A-5D are graphs illustrating generation, transmission and reception of a target region boundary signal 62 by system 220. FIG. 5A is a graph of one example target region boundary signal generation control signal 302 that is output by boundary signal driving circuit 224 to electrical current source 228. Control signal 302 has a pattern corresponding to the target region boundary signal 62 that is subsequently sensed by sensor 238. FIG. 5B is a graph illustrating an example current signal 304 along wire 232 as output by electrical current source 228 in response to the example control signals 302 shown in FIG. 5A. FIG. 5C is a graph illustrating an example of magnetic field 242, magnetic field 306, serving as a target region boundary signal 62. Magnetic field 306 is a result of the example electrical current 304 carried along wire 232 and as illustrated in FIG. 5B. FIG. 5D is a graph depicting a voltage 308 over time of the electrical current induced in sensor 238 as a result of the example magnetic field 306 illustrated in FIG. 5C. The voltage 308 fluctuates in a pattern, with one or more frequencies, corresponding to the pattern of the target region control signal 306 and the pattern of the initial control signal 302 and output electrical current 304. The voltage 308 fluctuates with at least one embedded frequency equal to or within a predefined range of at least one frequency known to electronics 50 as a signature or signatures of a valid target region boundary signal.

Figure 6:
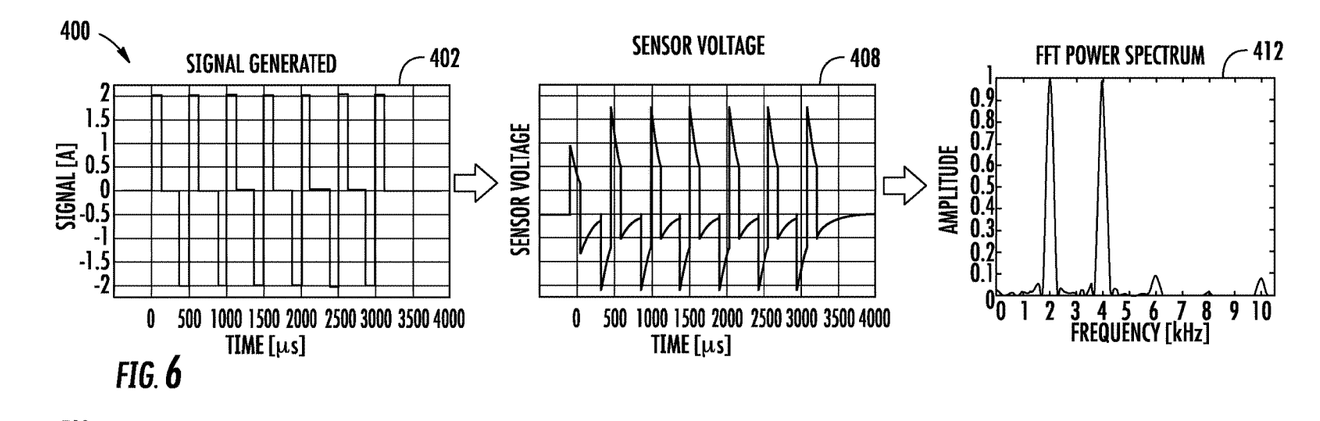
FIGS. 6 and 7 are graphs illustrating the generation, reception, and transformation of two different target region boundary signals.
Figure 7:
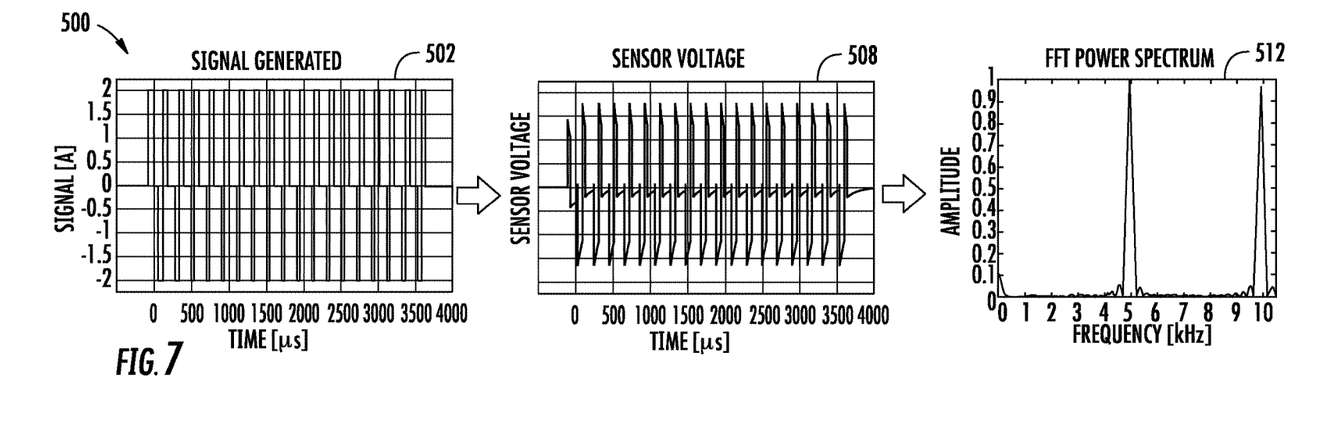

FIGS. 6 and 7 illustrate the generation and conversion of two different example target region boundary signals by system 224 to facilitate the determination of whether the candidate signal is associated with a target region or is an extraneous signal. FIG. 6 illustrates the generation, reception and transformation of a first target region boundary signal 400. As shown by FIG. 6, boundary signal driving circuit 224 generates an example target region boundary signal generation control signal 402, similar to signal 302 described above. As a result, a corresponding electrical current is output to wire 232 results in a corresponding magnetic field about wire 232 (shown in FIG. 4).

The magnetic field induces an electrical current in sensor 238, wherein sensor 238 outputs a sensor voltage signal 408 to electronics 50. Electronics 50 converts the sensor voltage signal 408, based upon the target region boundary signal 62, from a time domain to a frequency domain. In the example illustrated, electronics 50 carries out method 150 described above by carrying out a fast Fourier transform of the voltage signal, by determining a fast Fourier transform power spectrum of the voltage signal and by normalizing the fast Fourier power spectrum of the voltage signal 408 to produce the fast Fourier normalized power spectrum 412. Electronics 50 compares at least one characteristic of the fast Fourier normalized power spectrum 412 to at least one signature fast Fourier normalized power spectrum characteristic of a valid target region boundary signal to confirm that the signal is for the boundary of a selected or target region.

In the example illustrated, the control signals 402 have embedded therein multiple predefined frequencies. Because multiple predefined frequencies are embedded within the control signals, and ultimately the magnetic target region boundary signal 242 and sensor voltage signal 408, the likelihood of an extraneous neighboring region signal 72 being incorrectly determined as a target region signal is reduced. For example, in such an implementation, to qualify as a valid target region boundary signal, the candidate signal must be found to possess particular signature combination of multiple embedded frequencies assigned to a valid target region boundary signal. In other words, in circumstances where a valid target region boundary signal is defined, and known to electronics 50, as a signal having a first embedded frequency and a second embedded frequency, the candidate signal must exhibit characteristics sufficiently close to or within both a predefined range of characteristics of the first embedded frequency and a predefined range of characteristics of the second embedded frequency. Although the example illustrates the embedding of two different frequencies within the target region boundary signal, in other implementations, more than two frequencies are embedded within the target region boundary signal.

In the example illustrated, the frequencies embedded into the target region boundary signal are whole multiples of one another. In one implementation, the frequencies embedded into the target region boundary signal are doubles of one another. For example, in one implementation, a target region boundary signal may have frequencies of 2 and 4 kHz. In another implementation, the target region boundary signal may have frequencies of 5 and 10 kHz. In another implementation, the target region boundary signal may have frequencies of 3.5 and 7 Hz. Because the target region boundary signals have frequencies that are whole multiples of one another, boundary signal driving circuit 224 more easily generates the control signals for driving the target region boundary signal. As a result, boundary signal driving circuit 224 is less complex and less costly. In other implementations, the multiple embedded frequencies of the target region boundary signal may have other relative values.

FIG. 7 illustrates the generation, reception and transforming of a second target region boundary signal 500. As with signal 400, signal 500 begins as a target region boundary signal generation control signal 502 which results in a corresponding electrical current signal along wire 232 and a corresponding magnetic field signal which induces an electrical current within sensor 238. As a result of induced electrical current, the sensor 23 outputs a sensor voltage 508 to electronics 50. Electronics 50 transforms the sensor voltage 508 according to method 150 described above to produce the normalized fast Fourier transform power spectrum 512. Characteristics of the normalized fast Fourier power spectrum 512 are compared to signature characteristics of a valid target region boundary signal, known to electronics 50, to confirm that the signal is for the boundary of a selected or target region. As with signal 400, signal 500 has embedded therein multiple frequencies, wherein signal 500 must be found to possess the particular signature combination of multiple embedded signature frequencies assigned to a valid target region boundary signal to be deemed a valid target region boundary signal.

In the example illustrated, electronics 50 compares the normalized fast Fourier power spectrum of a signal 412, 512 to the predefined or signature normalized fast Fourier transform power spectrum of a valid target region boundary signal by checking for peaks in the normalized fast Fourier power transform spectrum of the candidate signal that are near predefined fundamental frequencies assigned as signatures for a valid target region boundary signal. If such peaks are found in the normalized fast Fourier power transform spectrum of the candidate signal, electronics 50 determines whether such peaks satisfy a predefined frequency location threshold and a predefined magnitude threshold assigned to a valid target region boundary signal. In other words, electronics 50 determines whether the location of the peaks is within a predefined range or within a predefined distance from a corresponding peak that would be found in a normalized fast Fourier power transform of a valid target region boundary signal. Electronics 50 further determines whether the peak of the normalized fast Fourier power transform spectrum of the candidate signal has a magnitude that satisfies a predefined threshold based upon the corresponding peak that would be found in a normalized fast Fourier power transform of a valid target region boundary signal. If peaks are found and if the peaks (A) are within a predefined range of corresponding peaks associated with a valid target region boundary signal and (B) have a magnitude that satisfies the predefined threshold for the corresponding peak associated with a valid target region, electronics 50 determines that the candidate signal is a valid target region boundary signal. In one implementation, electronics 50 applies a frequency location threshold of 150 Hz and it peak magnitude threshold of 0.15, wherein the fast Fourier power spectrum is normalized so that zero is minimum and one is maximum.

In other implementations, electronics 50 utilizes other criteria when comparing the characteristics of the at least one embedded frequency of a candidate signal to the at least one predetermined or signature characteristics of the at least one embedded frequency of a valid boundary signal. For example, in another implementation, electronics 50 omits the identification of peaks in the normalized fast Fourier power transfer spectrum of the candidate signal, but checks whether the normalized fast Fourier powered spectrum of the candidate signal exhibits a signal value within a predefined range or distance from a signature peak of the normalized fast Fourier transform power spectrum that also satisfies a predefined magnitude threshold. In yet other implementations, other characteristics of the Fourier transform of the candidate signal are compared to corresponding signature characteristics of a Fourier transform of what is predefined as a valid target region boundary signal.

Figure 8:
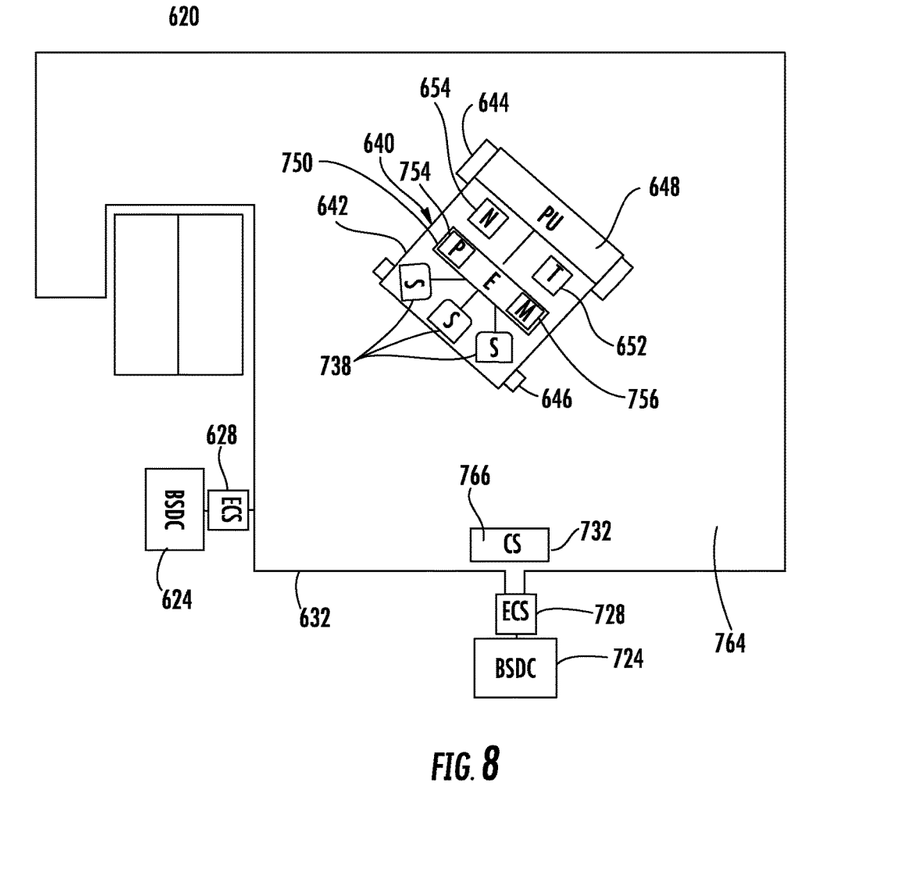
FIG. 8 is a schematic diagram of another example boundary signal detection system.

FIG. 8 schematically illustrates boundary signal detection system 620, an example boundary signal detection system 20. System 620 comprises boundary signal driving circuit 624, electrical current source 628, wire 632, boundary signal driving circuit 724, electrical current source 728, wire 732 and vehicle 640. Boundary signal driving circuits 624, 724 are similar to boundary signal driving circuit 224 described above. Boundary signal driving circuits 624, 724 output different boundary signal generation control signals to their respective electrical current sources 628, 728 to drive electrical current signals on the respective wires 632, 732. Electrical current source 628, 728 are similar to electrical current source 228 described above. Electrical current source 628 outputs an electrical current onto wire 632 while electrical current source 728 outputs an electrical current onto wire 732 based upon the boundary signal generation control signals received from circuits 624 and 724, respectively.

Wire 632 comprise an electrically conductive line extending proximate to or along boundaries of a target region 764. In other implementations, wire 632 has other sizes and shapes depending upon the characteristics of target region 764. Similarly, wire 732 comprise an electric conductive line extending proximate to or along boundaries of a second target region 766. In the example illustrated, wire 632 defines the outer boundary of target region 764 in which vehicle 640 is to be maintained. In other words, vehicle 640 is to move within target region 764 while being contained within target region 764. In the example illustrated, wire 732 defines the outer boundary of target region 766 which resides within target region 764. Target region 766 is a region within target region 764 in which vehicle 640 is not to intercept or cross into. In the example illustrated, wire 732 serves to output a target region boundary signal that serves as a homing signal to assist vehicle 640 in locating a certain home position within region 764. In one implementation, wire 732 serves as homing signal for a charging station CS for vehicle 640. In other implementations, wire 732 serves as a homing signal for region 766 which is used for other purposes.

Vehicle 640, schematically shown an enlarged for purposes of illustration, comprises frame 642, traction drivers 644, 646, propulsion unit 648, tool 652, notification device 654, sensors 738 and electronics 750. Frame 642 comprise a chassis or other structure supporting the remaining components of vehicle 640. Traction driver 644 comprise ground engaging members that, upon being driven, move vehicle 640. In the example illustrated, traction drivers 644, 646 comprise wheels. In one implementation, wheel 644, left wheel 644 and the right wheel 644, are independently drivable to facilitate steering of vehicle 640. In another implementation, the angular positioning of traction driver 646 is adjustable to steer vehicle 640. In yet other implementations, traction drivers 644 comprise tracks or other structures that facilitate the driving a vehicle 640.

Propulsion unit 648 comprise a device carried by frame 640 that powers and drives traction drivers 644 and/or traction drivers 646. In one implementation, propulsion unit 648 comprises an electric motor operably coupled to traction drivers 644 and/or traction drivers 646 by transmission. In yet another implementation, Paul unit 648 comprises an internal combustion engine operably coupled to traction drivers 644 and/or traction drivers 646 by transmission.

Tool 652 comprises at least one working device carried by vehicle 640. In one implementation, tool 652 interacts with the underlying terrain and/or vegetation on the underlying terrain. In one implementation, tool 652 comprises a blade that is rotatably driven by propulsion unit 648 or a separate independent rotational drive. In one implementation, the blade is to be rotatably driven about a vertical axis to cut vegetation, such as grass. In one implementation, tool 652 comprises a mower blade. In another implementation, the blade is rotatable about a horizontal axis, such as with an edger. As other implementations, tool 652 interacts with soil, such as with a cultivator or the like. In some implementations, tool 652 is operable at different non-zero speeds, is operable at different levels of torque or is operable at different heights relative to the underlying terrain. In some implementations, tool 652 is omitted, wherein vehicle 640 transports or carries a person or a payload.

Notification device 654 comprises a device that outputs visible and/or audible notifications to those proximate to vehicle 640. In one implementation, notification device 654 comprises a display screen and/or speaker by which a person riding upon vehicle 640 is presented with visible and/or audible information. In one implementation, notification device 654 comprises a light and/or speaker carried by frame 640 by which persons or animals proximate to vehicle 640 are provided with a notification. For example, in one implementation, notification device 654 may comprise a flashing or bright light and/or may comprise a speaker by which an alert is sounded or visibly presented to surrounding animals or persons near vehicle 640 or in the path of vehicle 640. In still other implementations, notification device 654 comprises a wireless transmitter which is in communication with a display or auditory device remote from vehicle 640, such as an independent remote monitor or an independent remote portable electronic device such as a smart phone, computer laptop, computer tablet, personal data assistant or the like, wherein notifications or information are transmitted to the remote and independent device for presenting information or notifications to a person.

Sensors 738 comprise sensors carried by vehicle 640 that are configured to sense boundary signals, such as boundary signals emanating from wire 632 and wire 732. In one implementation, sensors 738 are similar to sensor 238 described above, wherein each of sensors 738 comprises an inductor in which electrical current is induced in response to a magnetic field induced by current through a wire 632 and/or wire 732. The current profile matches the example target region boundary signal generation control signal 402, similar to signal 302. Sensors 738 sense candidate signals 76, described above, and transmit the resulting voltage signals to electronics 750.

In the example illustrated, vehicle 640 comprises a forward facing sensor, a leftward and forward facing sensor and a rightward and forward facing sensor. The different orientations of sensors 738 differently respond to the magnetic fields and candidate signals to determine the relative positioning of vehicle 640 with respect to wire 632 and/or wire 732. Although vehicle 640 is illustrated as comprising the three differently oriented sensors 738, in other implementations, vehicle 640 comprises a fewer or greater of such sensors at the illustrated or at other orientations and positions.

Electronics 750 are similar to electronics 50 described above. In the example illustrated, electronics 750 comprises circuitry that discerns valid target region boundary signals originating from wire 632 and/or wire 732 from other overlapping extraneous signals. In the example illustrated, electronics 750 comprises a computing device comprising processor 754 and memory 756. Processor 754 comprises at least one processing unit configured to follow instructions contained in memory 756 which comprises a non-transitory computer-readable medium. In one implementation, the term "processing unit" means a presently developed or future developed processing unit that executes sequences of instructions contained in a non-transitory computer-readable medium or memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, electronics 750 may be embodied as part of one or more application-specific integrated circuits (ASICs). Unless otherwise specifically noted, the controller is not limited to any specific combination of hardware circuitry and software, nor to any particular source for the instructions executed by the processing unit.

Processor 754, following instructions provided by memory 756, carries out method 100 described above with respect to FIG. 2. In one implementation, processor 754, following instructions provided by memory 756, converts candidate boundary signals from a time domain to a frequency domain according to the method 150 described above with respect to FIG. 3. In one implementation, processor 754 compares the at least one embedded frequency of a candidate signal to at least one predetermined signature embedded frequency of a valid boundary signal by checking for peaks in the normalized fast Fourier power transform spectrum of the candidate signal that are near predefined fundamental frequencies assigned as signatures for a valid target region boundary signal. If such peaks are found in the normalized fast Fourier power transform spectrum of the candidate signal, processor 754 determines whether such peaks satisfy a predefined frequency location threshold and a predefined magnitude threshold assigned to a valid target region boundary signal. In other words, processor 754 determines whether the location of the peaks is within a predefined range or within a predefined distance from a corresponding peak that would be found in a normalized fast Fourier power transform of a valid target region boundary signal. Processor 754 further determines whether the peak of the normalized fast Fourier power transform spectrum of the candidate signal has a magnitude that satisfies a predefined threshold based upon the corresponding peak that would be found in a normalized fast Fourier power transform of a valid target region boundary signal. If peaks are found and if the peaks (A) are within a predefined range of corresponding peaks associated with a valid target region boundary signal and (B) have a magnitude that satisfies the predefined threshold for the corresponding peak associated with a valid target region, processor 754 determines that the candidate signal is a valid target region boundary signal. In one implementation, processor 754 applies a frequency location threshold of 150 Hz and it peak magnitude threshold of 0.15, wherein the fast Fourier power spectrum is normalized so that zero is minimum and one is maximum. In other implementations, processor 754 utilizes other criteria when comparing the characteristics of the at least one embedded frequency of a candidate signal to the at least one predetermined or signature characteristics of the at least one embedded frequency of a valid boundary signal.

Figure 9:
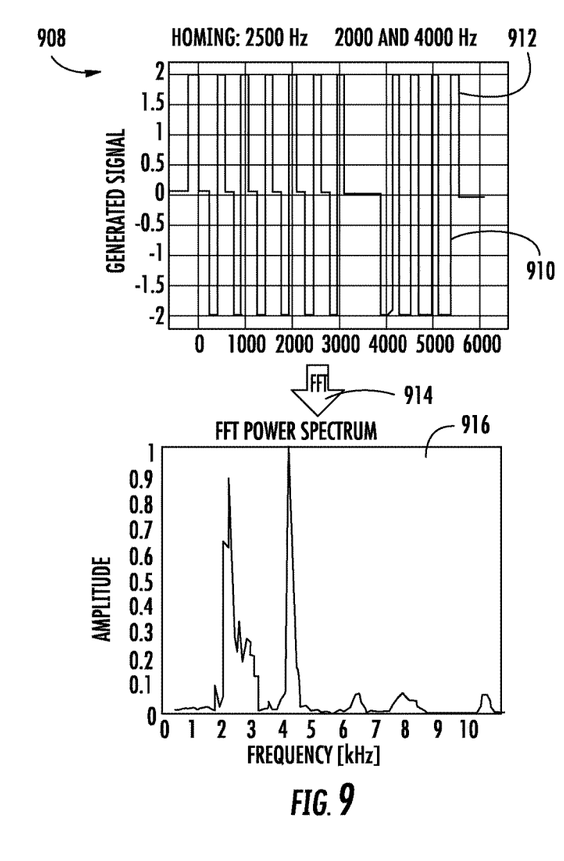
FIGS. 9 and 10 are graphs illustrating two example generated voltage signals or inputs to a signal generator and subsequent resulting frequency domains.

FIG. 9 illustrates an example sensor voltage 908 which is a result of sensing of signals from each of wire 632 and 732. In the example illustrated, wire 632 outputs a target region boundary signal having embedded frequencies of 2 kHz and 4 kHz. At the same time, wire 732 outputs a target region boundary signal of 2.5 kHz which serves as a homing signal. Sensor 738 receive both signals which results in the sensor voltage signal 908 having a first portion 910 attributable to the signal from wire 632 and a second portion 912 attributable to the signal from wire 732. As shown by FIG. 9, application of a fast Fourier transform 914 to sensor voltage signal 908 and normalization of a power spectrum of the fast Fourier transform results in the normalized fast Fourier transfer power spectrum 916 having unique characteristics for comparison to corresponding characteristics of the signature predetermined normalized fast Fourier transform power spectrum for the target region to confirm the validity of the voltage signal 908 as being for a valid target region boundary signal and homing signal.

Figure 10:
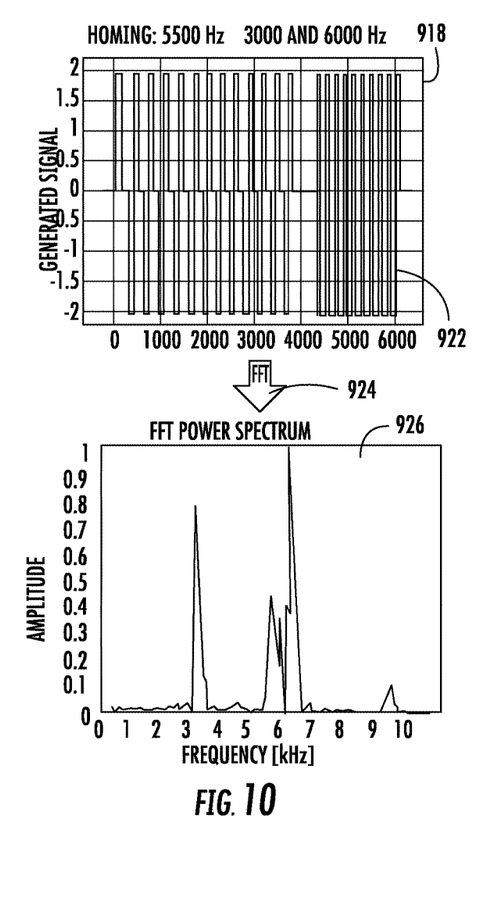

FIG. 10 illustrates another example sensor voltage 1008 which is a result of sensing of signals from each of wire 632 and 732. In the example illustrated, wire 632 outputs a target region boundary signal having embedded frequencies of 3 and 6 kHz. At the same time, wire 732 outputs a target region boundary signal of 5.5 kHz which serves as a homing signal. Sensor 738 receive both signals which results in the sensor voltage signal 918 having first portion 920 attributable to the signal from wire 632 and a second portion 922 attributable to the singer from wire 732. As shown by FIG. 9, application of a fast Fourier transform 924 to sensor voltage signal 918 and normalization of a power spectrum of the fast Fourier transform results in the normalized fast Fourier transfer power spectrum 926 having unique characteristics for comparison to corresponding characteristics of the signature predetermined normalized fast Fourier transform power spectrum for the target region to confirm the validity of the voltage signal 908 as being for a valid target region boundary signal and homing signal.

Figure 11:
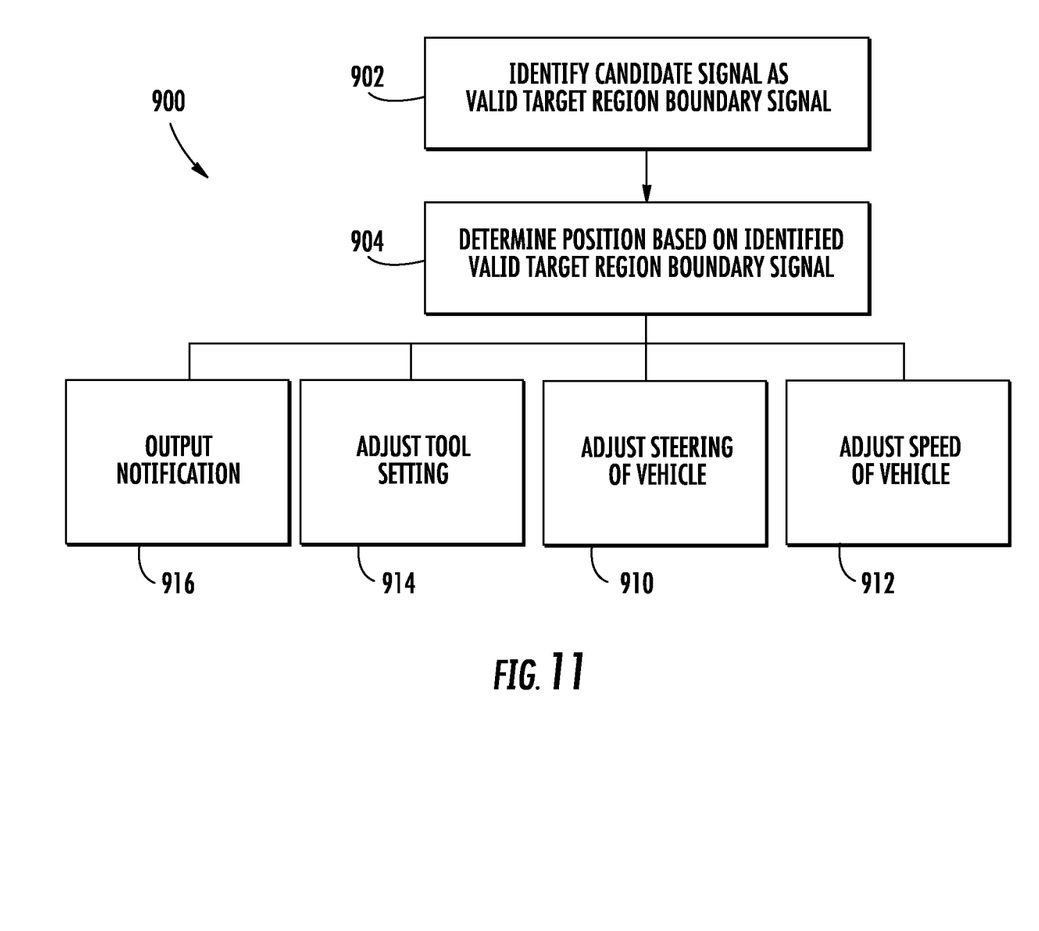
FIG. 11 is a flow diagram illustrating an example method for utilizing and identifying a valid target region boundary signal.

Once a candidate signal has been identified as a valid target region boundary signal, processing unit 754, following instructions contained in memory 756, ask upon the target region boundary signal. FIG. 11 is a flow diagram illustrating an example method 900 carried out by electronics 750 to act upon and use a candidate boundary signal determined to be a valid target region boundary signal. As indicated by block 902, method 900 is initiated with electronics 750 identifying a candidate boundary signal as a valid target region boundary signal as described above. As indicated by block 904, electronics 750 then utilizes the valid target region boundary signal to determine the position of vehicle 640 relative to wire 632 and/or wire 732. As noted above, the intensity of the candidate boundary signal and differences between the candidate boundary signal, as received by each of sensors 738, is utilized to ascertain the current relative position of vehicle 640.

As indicated by block 910, in one implementation in which vehicle 640 comprises a robotic appliance, an unmanned vehicle, electronics 750 utilizes the determined position of vehicle 642 generate control signals that are transmitted to propulsion unit 648. The control signals adjust the steering of vehicle 640 and adjust the direction in which the robotic appliance is driven. For example, as vehicle 640 approaches or upon reaching wire 632, electronics 750 outputs control signals causing vehicle 642 turn source avoid intersecting or crossing wire 632. In another implementation, upon receiving signals indicating that vehicle 640 is low on power, electronics 750 outputs control signals during vehicle 640 to a charging station based upon signals from wire 632 and/or based upon signals from wire 732. In one implementation, such control signals cause an actuator to redirect the angular orientation or direction of traction driver 646. In another implementation, such control signals cause traction driver 644 and/or traction driver 646 to be operated at different speeds so as to control the direction in which vehicle 640 is driven.

As indicated by block 912, in one implementation, electronics 750 adjusts the speed of vehicle 640 based upon the position of vehicle 640 determined block 904. In one implementation, data 640 comprises a robotic appliance, or the speed is adjusted based upon the position of the robotic appliance within target region 764 or with respect to wire 632 and/or wire 732. In other implementations where vehicle 640 is a manned vehicle, electronics 750 automatically adjusts the speed of vehicle 642 override a previously manually input speed.

As indicated by block 914, in some implementations, electronics 750 automatically adjusts a tool setting based upon the position of vehicle 640 relative to wire 632 and/or wire 732 as a determined block 904. For example, in one implementation, electronics 750 adjusts the speed are torque at which tool 652 is driven and/or a height of the tool. For example, in implementations where vehicle 640 comprises a mower, electronics 750 adjusts the speed at which the cutting blade of tool 652 is driven or the height of the cutting deck of tool 652 based upon the position of vehicle 640 within target region 764. In implementations where tool 652 of vehicle 640 distributes a material, such as herbicide, insecticide or fertilizer, electronics 750 adjusts such distribution based upon the position of vehicle 640 within target region 764. For example, based upon the determined position of vehicle 640, electronics 750 outputs control signals that adjust a rate at which herbicide, insecticide or fertilizer is supplied to a distribution blade or blower of tool 652 and/or adjusts the type of herbicide, insecticide or fertilizer that is currently being supplied or channeled to a distribution blade or blower of tool 652. In one implementation, electronics 750 automatically outputs control signals to a motor or transmission, wherein the signals adjust a speed at which a distribution blade or blower operates, depending upon the determined position of vehicle 640, to adjust the dispersion distance of the herbicide, insecticide and/or fertilizer.

As indicated by block 916, in lieu of or in addition to automatically adjusting steering, speed and/or tool settings, electronics 750 outputs notifications based upon the determined positioning of vehicle 640. In one implementation, electronics 750 outputs an alert or other notice, audibly are visibly to an operator, other persons or animals using notification device 654.

Figure 12:
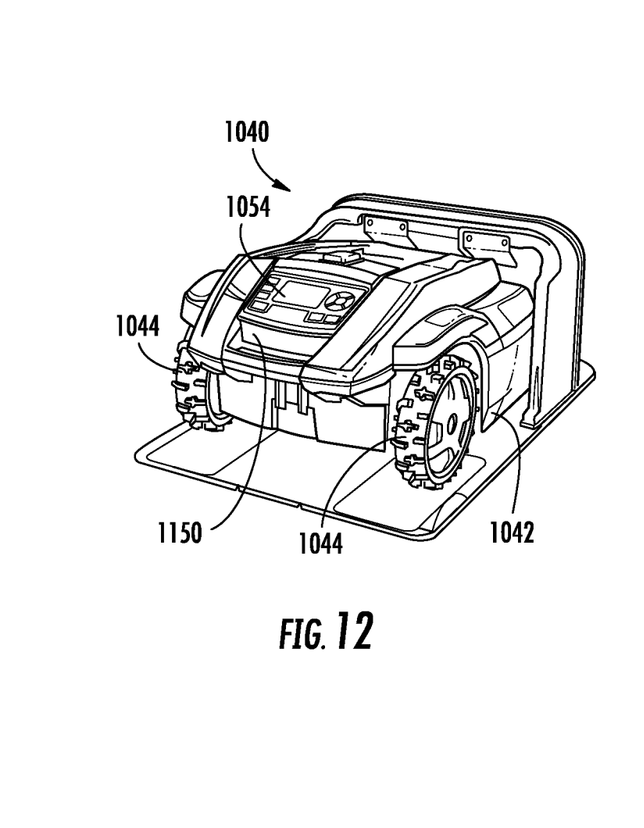
FIG. 12 is a rear perspective view of an example vehicle comprising an example boundary signal detection system.
Figure 13:
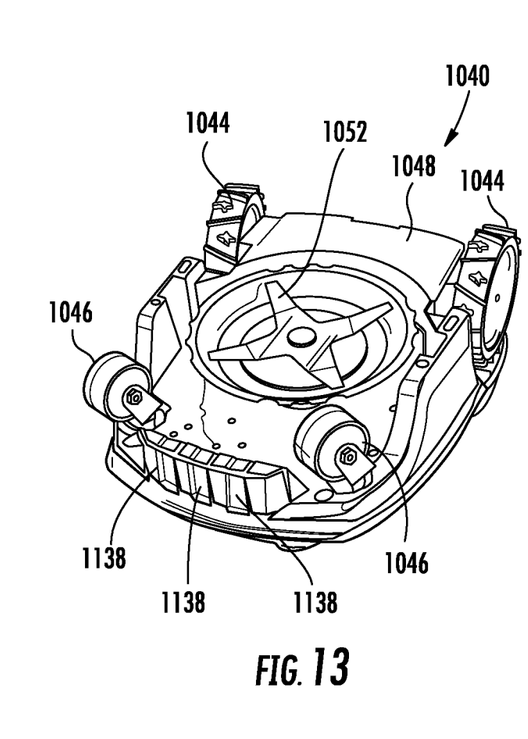
FIG. 13 is a bottom perspective view of the vehicle of FIG. 12.

FIGS. 12 and 13 illustrate vehicle 1040, an example of vehicle 640. In the example, vehicle 1040 comprises a robotic appliance in the form of a robotic mower. Vehicle 1040 comprises frame 1042, traction drivers 1044, 1046, propulsion unit 1048, tool 1052, notification device 1054, sensors 1138 and electronics 1150. Traction drivers 1044 probably coupled to a driven by propulsion unit 1048 comprising an electric motor powered by rechargeable battery. Tool 1052 comprises a cutting blade to be rotatably driven by propulsion unit 1048 about a vertical axis for cutting grass or other vegetation. Notification device 1054 comprises a display screen and speaker by which surrounding persons may be notified. Sensors 1138 are substantially similar to censor 738 described above. Electronics 1150 are substantially similar to electronics 750 described above. Similar to the operation of electronics 750, electronics 1150 carried out method 100 described above with respect to FIG. 2. Electronics 1150 further converts the candidate boundary signal to a time domain to a frequency domain following method 150 of FIG. 3.

In one implementation, electronics 1150 compares the at least one embedded frequency of a candidate signal to at least one predetermined signature embedded frequency of a valid boundary signal by checking for peaks in the normalized fast Fourier power transform spectrum of the candidate signal that are near predefined fundamental frequencies assigned as signatures for a valid target region boundary signal. If such peaks are found in the normalized fast Fourier power transform spectrum of the candidate signal, electronics 1150 determines whether such peaks satisfy a predefined frequency location threshold and a predefined magnitude threshold assigned to a valid target region boundary signal. In other words, electronics 1150 determines whether the location of the peaks is within a predefined range or within a predefined distance from a corresponding peak that would be found in a normalized fast Fourier power transform of a valid target region boundary signal. Electronics 1150 further determines whether the peak of the normalized fast Fourier power transform spectrum of the candidate signal has a magnitude that satisfies a predefined threshold based upon the corresponding peak that would be found in a normalized fast Fourier power transform of a valid target region boundary signal. If peaks are found and if the peaks (A) are within a predefined range of corresponding peaks associated with a valid target region boundary signal and (B) have a magnitude that satisfies the predefined threshold for the corresponding peak associated with a valid target region, electronics 1150 determines that the candidate signal is a valid target region boundary signal. In one implementation, electronics 1150 applies a frequency location threshold of 150 Hz and it peak magnitude threshold of 0.15, wherein the fast Fourier power spectrum is normalized so that zero is minimum and one is maximum. In other implementations, electronics 1150 utilizes other criteria when comparing the characteristics of the at least one embedded frequency of a candidate signal to the at least one predetermined or signature characteristics of the at least one embedded frequency of a valid boundary signal.

Upon determining that a candidate signal is a valid target region boundary signal, electronics 1150 carried out method 900 described above with respect to FIG. 11. In one implementation, electronics 1150 automatically adjusts the steering and speed of vehicle 1040 based upon the position of vehicle 1040 within target region 764 and relative to at least one wire defining at least one target region. In one implementation, electronics limb 50 automatically adjusts the on-off state, the non-zero speed and/or the cutting height of the blade serving as took 1052 based upon the position of vehicle 1040 determined using the candidate signal identified as a valid target region boundary signal. Some implementations, electronics 1150 additionally outputs notifications, such as when or as vehicle 1040 approaches a boundary.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A boundary signal detection system to distinguish a valid boundary signal for a target region from an extraneous boundary signal for a neighboring region, the boundary signal detection system comprising:

a vehicle having a propulsion unit, the vehicle carrying a sensor to acquire a candidate boundary signal; and electronics to:

convert the acquired candidate boundary signal from a time domain to a frequency domain to identify at least one embedded frequency in the candidate boundary signal;

compare the at least one embedded frequency in the candidate boundary signal to at least one predetermined embedded frequency of the valid boundary signal; and identify the candidate boundary signal as the valid boundary signal based upon the comparison.

2. The boundary signal detection system of claim 1, wherein the converting of the candidate boundary signal from a time domain to a frequency domain comprises carrying out a Fourier transform of the candidate boundary signal.

3. The boundary signal detection system of claim 1, wherein the converting of the candidate boundary signal from a time domain to a frequency domain comprises:

carrying out a fast Fourier transform of the candidate boundary signal;

computing the power spectrum of the fast Fourier transform; and normalizing the fast Fourier transform power spectrum of the candidate boundary signal.

4. The boundary signal detection system of claim 1, wherein the converting of the candidate boundary signal from a time domain to a frequency domain comprises:

carrying out a fast Fourier transform of the candidate boundary signal;

computing the power spectrum of the fast Fourier transform; and normalizing the fast Fourier transform power spectrum of the candidate boundary signal; and wherein the comparing of the at least one embedded frequency in the candidate boundary signal to at least one predetermined embedded frequency of the valid boundary signal comprises:

comparing the normalized fast Fourier transform power spectrum of the candidate boundary signal, proximate to predetermined fundamental frequencies of the valid boundary signal, to a magnitude threshold, wherein the identification of the candidate boundary signal as the valid boundary signal is based upon the comparison to the magnitude threshold.

5. The boundary signal detection system of claim 1, wherein the converting of the candidate boundary signal from a time domain to a frequency domain comprises:

carrying out a fast Fourier transform of the candidate boundary signal;

computing the power spectrum of the fast Fourier transform; and normalizing the fast Fourier transform power spectrum of the candidate boundary signal; and wherein the comparing of the at least one embedded frequency in the candidate boundary signal to at least one predetermined embedded frequency of the valid boundary signal comprises:

identifying peaks in the normalized fast Fourier transform power spectrum of the candidate boundary signal proximate to predetermined fundamental frequencies of the valid boundary signal; and comparing the identified peaks to a frequency location threshold and a magnitude threshold, wherein the identification of the candidate boundary signal as the valid boundary signal is based upon the comparison of the identified peaks to the frequency location threshold and magnitude threshold.

6. The boundary signal detection system of claim 1 further comprising a boundary driving circuit to transmit the valid boundary signal indicating a boundary for the target region.

7. The boundary signal detection system of claim 1, further comprising a boundary driving circuit to transmit a valid boundary signal indicating a boundary for the target region, wherein the boundary driving circuit transmits the valid boundary signal on a boundary wire.

8. The boundary signal detection system of claim 1 further comprising a boundary driving circuit to transmit the valid boundary signal indicating the boundary for the target region, wherein the valid boundary signal comprises a plurality of embedded frequencies, the plurality of embedded frequencies being whole multiples of one another.

9. The boundary signal detection system of claim 1 further comprising a vehicle having a propulsion unit and carrying a sensor to acquire the acquired candidate boundary signal, wherein the electronics are further to output control signals to the propulsion unit to direct movement of the vehicle, the control signals being based upon candidate boundary signals identified as the valid boundary signal.

10. The boundary signal detection system of claim 1 further comprising a vehicle having a propulsion unit and carrying a sensor to acquire the acquired candidate boundary signal, the electronics to further determine a position of the vehicle based upon candidate boundary signals identified as the valid boundary signal.

11. A robotic appliance comprising:
a propulsion unit to move the robotic appliance;
a boundary sensor carried by the robotic appliance, the boundary sensor comprising an inductor to receive a candidate boundary signal;
electronics carried by the robotic appliance to:
  convert the candidate signal from a time domain to a frequency domain to identify at least one embedded frequency in the candidate boundary signal;
  compare the at least one embedded frequency in the candidate boundary signal to at least one predetermined embedded frequency of a valid boundary signal; and
  identify the candidate boundary signal as the valid boundary signal based upon the comparison; and
  output control signals to the propulsion unit to direct movement of the robotic appliance, the control signals being based upon candidate boundary signals identified as the valid boundary signal.

12. The robotic appliance of claim 11, wherein the converting of the candidate boundary signal from a time domain to a frequency domain comprises carrying out a Fourier transform of the candidate boundary signal.

13. The robotic appliance of claim 11, wherein the converting of the candidate boundary signal from a time domain to a frequency domain comprises:
carrying out a fast Fourier transform of the candidate boundary signal;
compute the power spectrum of the fast Fourier transform; and
normalizing the fast Fourier transform power spectrum of the candidate boundary signal.

14. The robotic appliance of claim 11, wherein the converting of the candidate boundary signal from a time domain to a frequency domain comprises:
carrying out a fast Fourier transform of the candidate boundary signal;
compute the power spectrum of the fast Fourier transform; and
normalizing the fast Fourier transform power spectrum of the candidate boundary signal; and
wherein the comparing of at least one embedded frequency in the candidate boundary signal to at least one predetermined embedded frequency of the valid boundary signal comprises:
comparing the normalized fast Fourier transform power spectrum of the candidate boundary signal, proximate predetermined fundamental frequencies of the valid boundary signal, to a magnitude threshold, wherein the identification of the candidate boundary signal as the valid boundary signal is based upon the comparison to the magnitude threshold.

15. The robotic appliance of claim 11, wherein the converting of the candidate boundary signal from a time domain to a frequency domain comprises:
carrying out a fast Fourier transform of the candidate boundary signal;
compute the power spectrum of the fast Fourier transform; and
normalizing the fast Fourier transform power spectrum of the candidate boundary signal; and
wherein the comparing of the at least one embedded frequency in the candidate boundary signal to at least one predetermined embedded frequency of the valid boundary signal comprises:
identifying peaks in the normalized fast Fourier transform power spectrum of the candidate boundary signal proximate predetermined fundamental frequencies of the valid boundary signal; and
comparing the identified peaks to a frequency location threshold and a magnitude threshold, wherein the identification of the candidate boundary signal as the valid boundary signal is based upon the comparison of the identified peaks to the frequency location threshold and magnitude threshold.

16. A vehicle position detection system comprising:
a boundary driving circuit to transmit a valid boundary signal indicating a boundary for a target region;
a vehicle to move relative to the boundary for the target region, the vehicle comprising:
  a boundary sensor carried by the vehicle, the boundary sensor comprising an inductor to receive a candidate boundary signal; and
  electronics to:
    determine whether the candidate boundary signal is the valid boundary signal for the target region or is an extraneous boundary signal for a neighboring region by:
      converting the candidate boundary signal from a time domain to a frequency domain to identify at least one embedded frequency in the candidate boundary signal;
      comparing the at least one embedded frequency in the candidate boundary signal to at least one predetermined embedded frequency of the valid boundary signal; and
      identifying the candidate boundary signal as the valid boundary signal based upon the comparison; and
    determine a position of the vehicle based upon candidate boundary signals identified as the valid boundary signal.

17. The vehicle position detection system of claim 16, wherein the valid boundary signal indicates an outer boundary for the target region.

18. The vehicle position detection system of claim 16, wherein the valid boundary signal indicates an inner boundary for the target region.

19. The vehicle position detection system of claim 16, wherein the boundary driving circuit transmits the valid boundary signal on a boundary wire.

* * * * *